Patented Jan. 3, 1950

2,493,319

UNITED STATES PATENT OFFICE 2,493,319

SUBSTITUTED IMIDAZOLIUM COMPOUNDS

Horace A. Shonle, Indianapolis, and Edwin R. Shepard, Beech Grove, Ind., assignors to Eli Lilly and Company, Indianapolis, Ind., a corporation of Indiana No Drawing. Application July 14, 1945,
Serial No. 605,190

5 Claims. (Cl. 260—309)

This invention relates to a group of new organic compounds and more particularly to new substituted imidazolium compounds.

By this invention we have provided new compositions of matter which may be represented by the following formula:

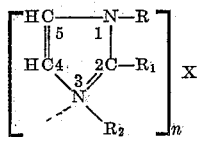

where R and $R_1$ are aliphatic hydrocarbon radicals, one of the radicals having from 1 to 7 carbon atoms and the other having from 7 to 18 carbon atoms; $R_2$ is a benzyl radical which may be substituted by halogen or nitro groups; X is an anion; and $n$ is an integer from 1 to 3 inclusive.

The compositions of matter of our invention may be regarded as comprising positively charged imidazolium cations which are substituted by aliphatic hydrocarbon radicals and a benzyl or substituted benzyl radical, and which are combined with negatively charged anions. The aliphatic hydrocarbon groups may be selected from straight chain saturated, branched chain saturated, and straight and branched chain unsaturated groups such as, for example, the ethyl, isoamyl, and allyl groups. The benzyl group may be unsubstituted or may be substituted by one or more halogen atoms giving rise to chlorobenzyl groups such as, for example, 2-chlorobenzyl and 2,4-dichlorobenzyl groups, and may also be substituted by one or more nitro groups giving rise to nitrobenzyl groups such as, for example, 2-nitrobenzyl and 2,4-dinitrobenzyl groups. The negatively charged anion associated with the imidazolium cation may be any one of a number of negative ions such as, for example, the chloride, bromide, sulfate, acetate or phosphate ions.

By way of example and referring to the above structural formula, when R is is methyl group, $R_1$ a n-decyl group, $R_2$ a benzyl group, X a chloride ion and $n$ is 1, the compound is 1-methyl-2-n-decyl-3-benzylimidazolium chloride. Additionally, when R is a n-dodecyl group, $R_1$ an isoamyl group, $R_2$ a 2-chlorobenzyl group, X a sulfate ion, and $n$ is 2, the compound is di-[1-n-dodecyl-2-isoamyl-3-(2'-chlorobenzyl) - imidazolium]sulfate.

It should be noted that two forms of our compounds exist simultaneously because of a dynamic equilibrium. Thus, compounds of our invention may be represented by either of the following formulae:

Formula A 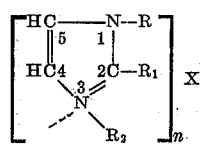 Formula B 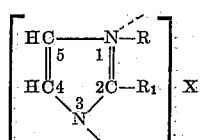

wherein R, $R_1$, $R_2$, X, and $n$ have the same significance as before. In Formula A, the nitrogen at position 1 is tertiary, and the nitrogen at position 3 is quaternary. In Formula B, the nitrogen at position 1 is quaternary, and the nitrogen in position 3 is tertiary. In the specification and claims we employ for convenience Formula A, wherein R is attached to the tertiary nitrogen at position 1, and $R_2$ is attached to the quaternary nitrogen at position 3. It will be understood that the two forms illustrated are to be regarded as equivalent and that both forms are to be considered as within the scope of this invention.

The compounds we have invented have several fields of utility. For example, they are effective in reducing the surface tension of aqueous solutions. They have bacteriostatic properties. Additionally, they are possessed of therapeutic qualities which make them suitable for application in the treatment of various bacterial invasions.

Broadly, we may prepare the compounds embodied in our invention by reacting a suitably substituted imidazole with a member of the class of alkylating or arylating agents such as, for example, the nitrates, sulfates, or halides of alkyl or aryl compounds. It is usually most convenient to employ the halides since they are readily available, and for therapeutic compounds we prefer to use halide containing an anion commonly employed in therapeutic compounds, such as chlorine, bromine, or iodine. The reaction is effected by mixing the substituted amidazole with the halide of the desired alkyl or aryl compound, allowing any spontaneous reaction to subside and subsequently heating the mixture to complete the reaction. The product may be purified by recrystallization or purification from suitable solvents or mixtures thereof. The theoretical amount of the halide may be used, but it is preferable to use an excess to assure completion of the reaction. The reaction is conveniently, although not necessarily, carried out in a closed system thus eliminating any loss of the halide by volatilization. If desired, a suitable non-reactive solvent such as, for example, alcohol or ethyl acetate may be used as a vehicle during the reaction.

It should be noted that the compounds of our invention comprising a mixture of two forms as mentioned heretofore may be prepared by either of two routes. An imidazole substituted by the groups R and $R_1$ may be arylated by means of an $R_2$-containing arylating agent. Likewise an imidazole substituted by the groups $R_1$ and $R_2$ may be alkylated by means of an R-containing alkylating agent. The same compound results when R, $R_1$, and $R_2$ are correspondingly identical in each reaction.

The compounds of our invention are salt-like and generally water-soluble, and consequently are subject to many of the ionic reactions which typify soluble inorganic salts. By anionic interchange reactions, one anion may be substituted for another. For example, by taking advantage of the lower solubility of a substituted imidazolium sulfate as compared with the solubility of the corresponding imidazolium chloride, the sulfate may be crystallized preferentially from a solution containing the imidazolium, sulfate and chloride ions. Illustrating another method of effecting this conversion, an aqueous solution of substituted imidazolium halide may be shaken with substantially insoluble silver sulfate, whereby the halide ion is removed as insoluble silver halide leaving in solution the imidazolium sulfate. Additionally, ionic interchange may be effected through the hydroxyl ion as an intermediate. Upon shaking an aqueous solution of a substituted imidazolium halide with silver oxide, there is formed the corresponding soluble imidazolium hydroxide and insoluble silver halide. Treatment of the soluble imidazolium hydroxide solution with the appropriate acid forms the desired imidazolium compound.

The following examples illustrate methods by which we may prepare the new compositions of matter of our invention.

*Example 1*

1 - methyl - 2 - n-undecyl-3-benzylimidazolium bromide represented by the formula

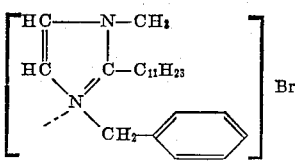

may be prepared by reacting benzyl bromide with 1-methyl-2-n-undecylimidazole in the following manner:

The 1-methyl-2-n-undecylimidazole used in the synthesis was prepared by refluxing a mixture of 171 g. of ethyl laurate and 135 g. of anhydrous ethylene diamine at 110–112° C. for 12 hours. The alcohol and excess ethylene diamine were removed by distillation and 172 g. of crude N-lauroyl ethylene diamine was obtained. A mixture of 162 g. of the crude N-lauroyl ethylene diamine and 187 g. of powdered calcium oxide was heated with stirring at 225° C. for 36 hours. The reaction mixture was cooled to room temperature and extracted three times with about 350 cc. of alcohol. The extract was distilled in vacuo and the reaction product, 2-n-undecyl-4,5-dihydroimidazole, distilled at 180–189° C./10 mm. and melted at 81–83° C. To 56.5 g. of the 2-n-undecyl-4,5-dihydroimidazole was added 31.7 g. of dimethyl sulfate, the temperature of the reaction during the addition being maintained at about 85° C. About 150 cc. of water was added and the reaction mixture stirred until the solid material had dissolved. An aqueous solution of 20 g. of 50 percent sodium hydroxide and about 150 cc. of butyl alcohol was added to the reaction mixture with agitation, the mixture filtered and the butyl alcohol layer separated. The reaction product, 1-methyl-2-n-undecyl-4,5-dihydroimidazole, was obtained by evaporation of the butyl alcohol and distillation of the residue at 167–172° C./6 mm. A mixture of 30.9 g. of 1-methyl-2-n-undecyl-4,5-dihydroimidazole and 3.1 g. of nickel catalyst was heated at 226–246° C. until no more hydrogen was evolved. The desired reaction product, 1-methyl-2-n-undecylimidazole, was isolated by distilling the reaction mixture at 166–203° C./5 mm.

A mixture of 8.3 g. of 1-methyl-2-n-undecylimidazole, 5 cc. of benzyl bromide and 50 cc. of ethyl acetate was heated in a pressure bottle at 100° C. for one hour. An additional amount of 25 cc. of ethyl acetate was then added and the contents dissolved by heating to boiling. Upon cooling to about 0° C. there separated a precipitate of 1-methyl-2-n-undecyl-3-benzylimidazolium bromide which upon recrystallization from a mixture of ethyl acetate and absolute ethyl alcohol melted at about 186–187° C.

*Example 2*

1-methyl-2-n-undecyl-3-(4'-nitrobenzyl) - imidazolium chloride represented by the formula

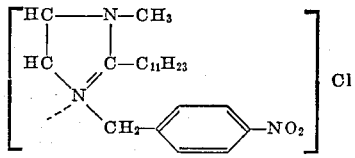

may be prepared by reacting 1-methyl-2-n-undecylimidazole with 4-nitrobenzyl chloride as follows:

A cold mixture of 1.8 g. of 1-methyl-2-n-undecylimidazole and 2 g. of 4-nitrobenzyl chloride was sealed in a glass tube and heated to 110–120° C. for two hours. The tube was cooled to room temperature, its contents dissolved in about 50 cc. of hot ethyl acetate and the hot solution treated with decolorizing carbon and filtered. Upon cooling the filtrate to about 0° C. and adding petroleum ether, 1-methyl-2-n-undecyl-3-(4'-nitrobenzyl)-imidazolium chloride separated as an oil. It was purified by redissolving it in hot ethyl acetate, treating with decolorizing carbon, filtering and reprecipitating by the addition of petroleum ether. 1-methyl-2-n-undecyl-3-(4'-nitrobenzyl)-imidazolium chloride separated as an oil and was dried in a vacuum desiccator over sulfuric acid.

*Example 3*

1-methyl-2-n-nonyl-3-benzylimidazolium bromide represented by the formula

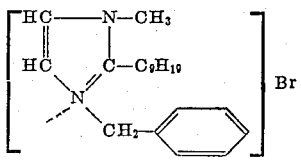

may be prepared by reacting 1-methyl-2-n-nonylimidazole with benzyl bromide as follows:

1-methyl-2-n-nonylimidazole was prepared from anhydrous ethylene diamine and ethyl decanoate in substantially the same manner as was prepared 1-methyl-2-n-undecylimidazole described in Example 1.

A cold mixture of 1.5 g. of 1-methyl-2-n-nonylimidazole and 1.9 g. of benzyl bromide was sealed in a tube and the tube heated for one hour at 110° C. The tube was then cooled to about room temperature, its contents dissolved in about 50 cc. of a hot mixture of ethyl acetate and ethyl alcohol, and the solution treated with decolorizing carbon and filtered. Upon cooling the filtrate to about 0° C., there separated a crystalline precipitate of 1-methyl-2-n-nonyl-3-benzylimidazolium bromide which after recrystallization from a mixture of ethyl acetate and absolute ethyl alcohol melted at about 193–195° C.

*Example 4*

1-n-decyl-2-methyl-3-benzylimidazolium bromide represented by the formula

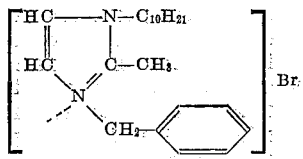

may be prepared from 1-n-decyl-2-methylimidazole and benzyl bromide as follows:

1-n-decyl-2-methylimidazole was prepared by heating a mixture of 203 g. of N-acetyl ethylene diamine and 560 g. of finely powdered calcium oxide to 225–235° C. for 14 hours. After cooling to 90–100° C. the mixture was extracted with three 500 cc. portions of alcohol. The alcohol was evaporated and the residue upon distillation at 195–198° C. yielded 2-methyl-4,5-dihydroimidazole. A mixture of 50.4 g. of 2-methyl-4,5-dihydroimidazole, 52.8 g. of n-decylchloride and 100 cc. of benzene was refluxed for several hours and then cooled to 25° C. A solution of 24 g. of 50 percent sodium hydroxide solution in 150 cc. of water was added, the mixture filtered and the benzene layer separated from the filtrate. The benzene was removed in vacuo and the crude 1-n-decyl-2-methyl-4,5-dihydroimidazole distilled at 155–156° C./6 mm. A mixture of 3.2 g. of nickel catalyst and 6.7 g. of 1-n-decyl-2-methyl-4,5-dihydroimidazole was heated with agitation to 225–235° C. until hydrogen was no longer evolved. The reaction mixture was cooled to 125° C. and a further amount of ½ g. of nickel catalyst added. The heating was resumed and continued until hydrogen evolution ceased. The desired 1-n-decyl-2-methylimidazole thus obtained was purified by distilling at 153–160° C./5.5 mm.

A cold mixture of 1.8 g. of 1-n-decyl-2-methylimidazole and 1.9 g. of benzyl bromide was sealed in a tube and the tube was heated at 100–110° C. for two hours. The tube was then cooled to room temperature, its contents dissolved in about 40 cc. of boiling ethyl acetate-ethyl alcohol mixture, and the solution treated with decolorizing carbon and filtered. Upon cooling the filtrate to about 0° C., 1-n-decyl-2-methyl-3-benzylimidazolium bromide crystallized from solution. It was recrystallized from a mixture of ethyl acetate and dioxane and when pure melted at about 87–88° C.

1-n-decyl-2-methyl-3-benzylimidazolium chloride was prepared from 1-n-decyl-2-methylimidazole and benzyl chloride in substantially the same manner as 1-n-decyl-2-methylimidazolium bromide was prepared from 1-n-decyl-2-methylimidazole and benzyl bromide. 1-n-decyl-2-methyl-3-benzylimidazolium chloride melted at about 112–114° C.

1-n-decyl-2-methyl-3-benzylimidazolium iodide was prepared in substantially the same manner using benzyl iodide and melted at about 86–87° C.

*Example 5*

1-n-decyl-2-methyl-3-(4'-chlorobenzyl)-imidazolium chloride represented by the formula

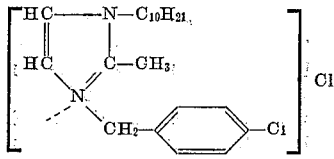

may be prepared by reacting 1-n-decyl-2-methylimidazole with 4-chlorobenzyl chloride in a sealed tube reaction by the method described in Example 4.

1-n-decyl-2-methyl-3-(4'-chlorobenzyl)-imidazolium chloride melted at about 125–127° C.

*Example 6*

1-methyl-2-n-heptyl-3-(2',4'-dichlorobenzyl)-imidazolium chloride represented by the formula

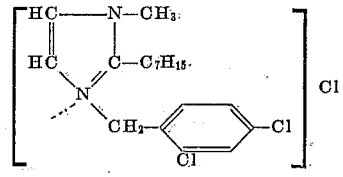

may be prepared from 1-methyl-2-n-heptylimidazole and 2,4-dichlorobenzyl chloride as follows:

1-methyl-2-n-heptylimidazole was prepared from anhydrous ethylene diamine and ethyl n-octanoate in substantially the same manner as was prepared 1-methyl-2-n-undecylimidazole described in Example 1.

A mixture of 1.5 g. of 1-methyl-2-n-heptylimidazole and 2.3 g. of 2,4-dichlorobenzyl chloride was heated in a sealed tube at 120–140° C. for 45 minutes. The tube was then cooled to about room temperature, its contents dissolved in about 50 cc. of boiling ethyl acetate containing about 10 percent of ethyl alcohol, the solution treated with decolorizing carbon and filtered. Upon cooling the filtrate to about 0° C. there separated a crystalline precipitate of 1-methyl-2-n-heptyl-3-(2',4'-dichlorobenzyl)-imidazolium chloride which after recrystallization from ethyl acetate melted at about 109–110° C.

*Example 7*

1-methyl-2-n-heptyl-3-benzylimidazolium bromide represented by the formula

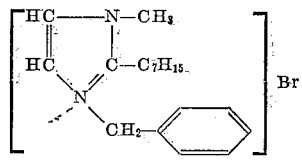

may be prepared by reacting 1-methyl-2-n-heptylimidazole with benzyl bromide in substantially the same manner as was 1-methyl-2-n-heptyl-2-(2',4'-dichlorobenzyl)-imidazolium chloride described in Example 6.

The 1-methyl-2-n-heptyl-3-benzylimidazolium bromide melted at about 186–187° C.

Example 8

1-n-tetradecyl-2-methyl-3-benzylimidazolium bromide represented by the formula

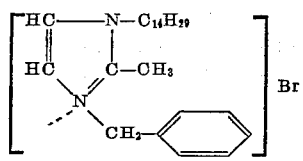

may be prepared by reacting 1-n-tetradecyl-2-methylimidazole with benzyl bromide.

The 1-n-tetradecyl-2-methylimidazole used in the preparation was prepared by a method analogous to that used in Example 4 for the preparation of 1-n-decyl-2-methylimidazole.

The 1-n-tetradecyl-2-methyl-3-benzylimidazolium bromide may be prepared in substantially the same manner as was 1-methyl-2-n-heptyl-3-(2',4'-dichlorobenzyl)-imidazolium chloride described in Example 6. The 1-n-tetradecyl-2-methyl-3-benzylimidazolium bromide melted at about 102–104° C.

Example 9

1-n-amyl-2-n-undecyl-3-benzylimidazolium bromide represented by the formula

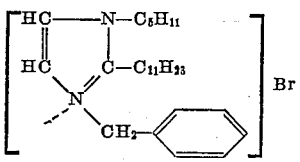

may be prepared by reacting 1-n-amyl-2-n-undecylimidazole with benzyl bromide by substantially the same method used in the preparation of 1-methyl-2-n-heptyl-3-(2',4'-dichlorobenzyl)-imidazolium chloride described in Example 6.

The 1-n-amyl-2-n-undecyl-3-benzylimidazolium bromide melted at about 116–117° C.

The 1-n-amyl-2-n-undecylimidazole used in the preparation was prepared by a method similar to that used in Example 1 for the preparation of 1-methyl-2-n-undecylimidazole.

Example 10

1-n-heptyl-2-methyl-3-benzylimidazolium chloride melting at about 141–142° C. and represented by the formula

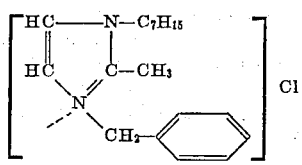

may be prepared by reacting 1-n-heptyl-2-methylimidazole with benzyl chloride by substantially the same method used in the preparation of 1-methyl-2-n-undecyl-3-(2',4'-dichlorobenzyl)-imidazolium chloride described in Example 6.

The 1-n-heptyl-2-methylimidazole was prepared by a method analogous to that used in the preparation of 1-n-decyl-2-methyl-imidazole described in Example 4.

Example 11

1-n-octadecyl-2-methyl-3-benzylimidazolium chloride represented by the formula

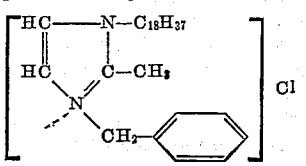

may be prepared by reacting 1-n-octadecyl-2-methylimidazole with benzyl chloride in a sealed tube as described in the preceding examples.

The 1-n-octadecyl-2-methylimidazole used in the reaction is obtained by a method similar to that used for the preparation of 1-n-decyl-2-methylimidazole described in Example 4.

Example 12

1-methyl-2-n-heptadecyl-3-benzylimidazolium bromide represented by the formula

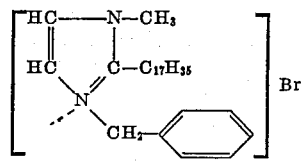

may be prepared by reacting 1-methyl-2-n-heptadecylimidazole with benzyl bromide in a sealed tube as described in the preceding examples.

The 1-methyl-2-n-heptadecylimidazole used in the synthesis is obtained from ethyl n-octadecanoate and ethylene diamine by a method similar to that used for the preparation of 1-methyl-2-n-undecylimidazole described in Example 1.

We claim as our invention:

1. A composition of matter represented by the formula:

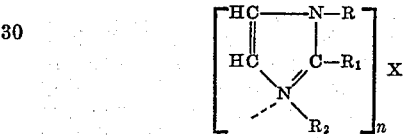

wherein R and $R_1$ are aliphatic hydrocarbon radicals, one of the radicals having from 1 to 7 carbon atoms and the other having from 7 to 18 carbon atoms; $R_2$ is a member of the class consisting of benzyl, monochlorobenzyl, dichlorobenzyl, mononitrobenzyl and dinitrobenzyl radicals; X is an anion and n is an integer from 1 to 3 inclusive.

2. A composition of matter represented by the formula:

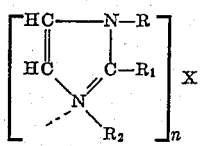

wherein R and $R_1$ are saturated aliphatic hydrocarbon radicals, one radical having from 1 to 7 carbon atoms and the other having from 7 to 18 carbon atoms; $R_2$ is a member of the class consisting of benzyl, monochlorobenzyl, dichlorobenzyl, mononitrobenzyl and dinitrobenzyl radicals; X is an anion and n is an integer from 1 to 3 inclusive.

3. 1-methyl-2-n-heptyl-3-benzylimidazolium bromide represented by the formula:

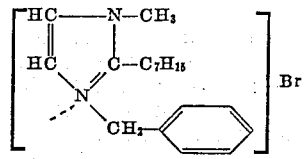

4. 1-n-decyl-2-methyl-3-benzylimidazolium bromide represented by the formula:

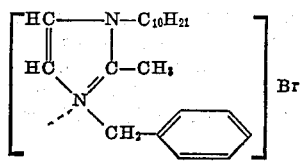

5. 1-n-heptyl-2-methyl-3-benzylimidazolium chloride reprented by the formula:
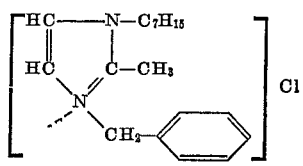
HORACE A. SHONLE.
EDWIN R. SHEPARD.
REFERENCES CITED
The following references are of record in the file of this patent:
UNITED STATES PATENTS
| Number | Name | Date |
|---|---|---|
| 2,042,023 | Schonhofer | May 26, 1936 |
| 2,404,299 | Kyrides | July 16, 1946 |
| 2,404,300 | Kyrides | July 16, 1946 |
FOREIGN PATENTS
| Number | Country | Date |
|---|---|---|
| 501,727 | Great Britain | Feb. 28, 1939 |